(12) United States Patent
Oh et al.

(10) Patent No.: US 7,667,811 B2
(45) Date of Patent: Feb. 23, 2010

(54) LIQUID CRYSTAL DISPLAY MODULE

(75) Inventors: Ji-Whan Oh, Cheongju-si (KR); Ki-Hoon Choi, Chilgok-gun (KR)

(73) Assignee: LG Display Co., Ltd., Seoul (KR)

( * ) Notice: Subject to any disclaimer, the term of this patent is extended or adjusted under 35 U.S.C. 154(b) by 87 days.

(21) Appl. No.: 11/937,845

(22) Filed: Nov. 9, 2007

(65) Prior Publication Data

US 2008/0151170 A1    Jun. 26, 2008

(30) Foreign Application Priority Data

Dec. 21, 2006    (KR) ...................... 10-2006-0131738

(51) Int. Cl.
*G02F 1/1345* (2006.01)

(52) U.S. Cl. ...................................... 349/149; 349/151

(58) Field of Classification Search .......... 349/149–152
See application file for complete search history.

(56) References Cited

U.S. PATENT DOCUMENTS 6,774,968 B2 *   8/2004   Hagiwara ................... 349/139

* cited by examiner

*Primary Examiner*—Kevin S Wood
(74) *Attorney, Agent, or Firm*—Birch, Stewart,Kolasch & Birch, LLP (57) ABSTRACT

A liquid crystal display (LCD) module includes a liquid crystal panel; a backlight unit supplying light to the liquid crystal panel; a PCB including a plurality of output pads connected to the liquid crystal panel and a plurality of dummy output pads; and a cover shield protecting the PCB and including an embossing pattern, wherein at least one of the plurality of dummy output pads facing the embossing pattern is electrically isolated.

11 Claims, 8 Drawing Sheets

LIQUID CRYSTAL DISPLAY MODULE

The present invention claims the benefit of Korean Patent Application No. 2006-0131738, filed in Korea on Dec. 21, 2006, which is hereby incorporated by reference.

TECHNICAL FIELD

The present application relates to a liquid crystal display module, and in particular, to a liquid crystal display (LCD) module and a method of fabricating the same.

BACKGROUND

Display devices have typically used cathode-ray tubes (CRT). Presently, much effort has been made to study and develop various types of flat panel displays, such as liquid crystal display (LCD) devices, plasma display panels (PDP), field emission displays, and electro-luminescence displays (ELD), as a substitute for CRT. LCD devices have advantages over the other flat panel displays, some of the advantages are high resolution, light weight, thin profile, compact size, and low power supply requirements.

In general, an LCD device includes two substrates that are spaced apart and face each other with a liquid crystal material interposed between the two substrates. The two substrates include electrodes that face each other. A voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD device displays images by varying the intensity of the induced electric field.

Because the LCD device is a non-emissive type display device, a backlight is needed to supply the non-emissive type display device with light.

Figure 1:
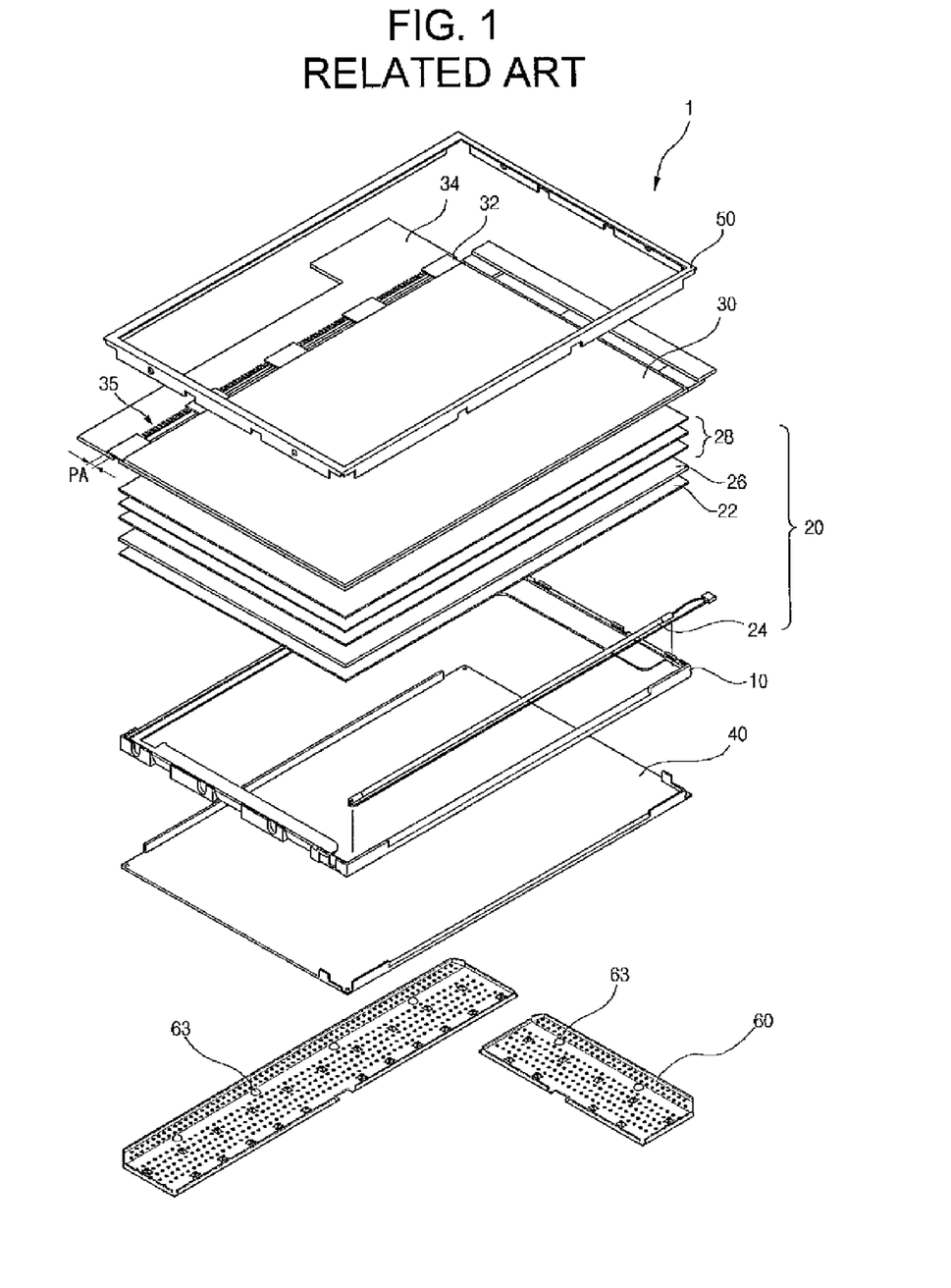
FIG. 1 is an exploded perspective view illustrating an LCD module according to the related art.
Figure 2:
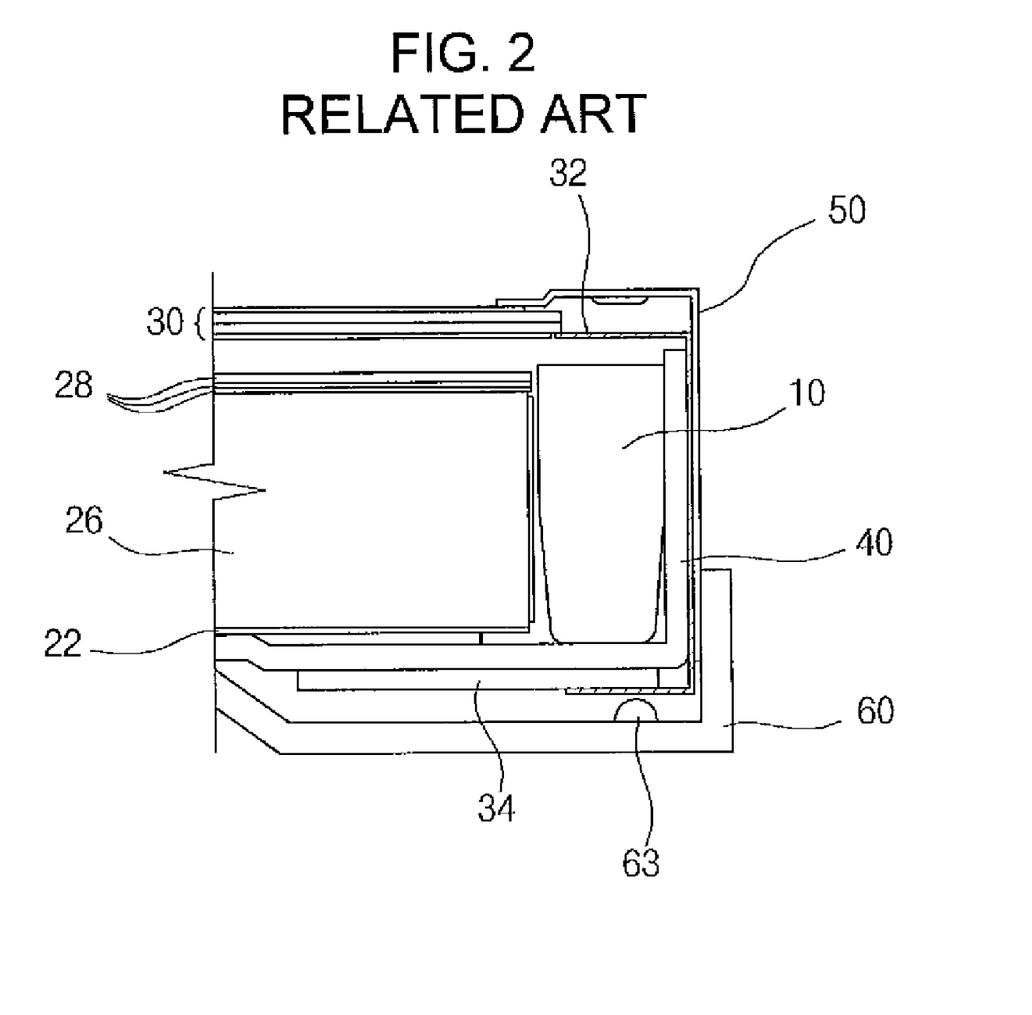
FIG. 2 is a cross-sectional view illustrating the LCD module of FIG. 1.

FIG. 1 is an exploded perspective view illustrating an LCD module according to the related art, and FIG. 2 is a cross-sectional view illustrating the LCD module of FIG. 1.

Referring to FIGS. 1 and 2, an LCD module 1 includes a liquid crystal panel 30, a backlight unit 20, a main supporter 10, a bottom cover 40 and a top cover 50.

The backlight unit 20 and the liquid crystal panel 30 are sequentially located over a bottom cover 40. The main supporter 10 has a rectangular frame shape and supports the backlight unit 20 and the liquid crystal panel 30. The main supporter 10 is combined with the bottom cover 40. The top cover 50 is disposed on the top of the LCD module 1. The top cover 50 presses and fixes a peripheral portion of the liquid crystal panel 30 and is combined with the main supporter 10 and the bottom cover 40.

A printed circuit board (PCB) 34 as a driving circuit of the liquid crystal panel 30 is connected to the liquid crystal panel 30 through a plurality of tape carrier package (TCP) films 32 which are flexible. The PCB 34 has a plurality of output pads and dummy output pads 35 in a pad portion PA. The TCP film 32 has a plurality of input pads and output pads. The liquid crystal panel 30 has a plurality of input pads. The output pad of the PCB 34 is connected to the input pad of the TCP film 32, and the output pad of the TCP film 32 is connected to the input pad of the liquid crystal panel 30. The dummy pads 35 are located between the output pads of the PCB 34.

To connect the output pad of the PCB 34 to the input pad of the TCP film 32, an anisotropic conductive film (ACF) is used. The ACF includes a bonding material and a plurality of conductive particles in the bonding material. The ACF is formed entirely in the pad portion PA. To improve bonding efficiency between the PCB 34 and the TCP film 32, the same output pad structure in the PCB 34 is formed, and to do this, the dummy output pads 35 are formed.

The backlight unit 20 includes a backlight 24, a reflecting sheet 22, a light guide plate 26, and optical sheets 28 such as a prism sheet and a diffusion sheet. A lamp 24 is used as the backlight 24, and the lamp 24 is located at a side portion of the LCD module 1. The lamp 24 is guided by a lamp guider (not shown) that partially covers the lamp 24. The lamp 24 is fixed by a couple of lamp holders that are located at both ends of the lamp 24.

A cover shield 60 is located below the bottom cover 40 and covers the PCB 34 and a lamp driving circuit.

Referring to FIG. 2, when modulizing the LCD module 1, for space efficiency, the PCB 34 is located below the bottom cover 40. To connect the PCB 34 at a bottom portion and the liquid crystal panel 40 at a top portion, the TCP film 32 is bent, for example, twice. The cover shield 60 has an embossing pattern 63 at an inner surface of the cover shield 60. The embossing pattern 63 faces and is spaced apart from the PCB 34.

Figure 3:
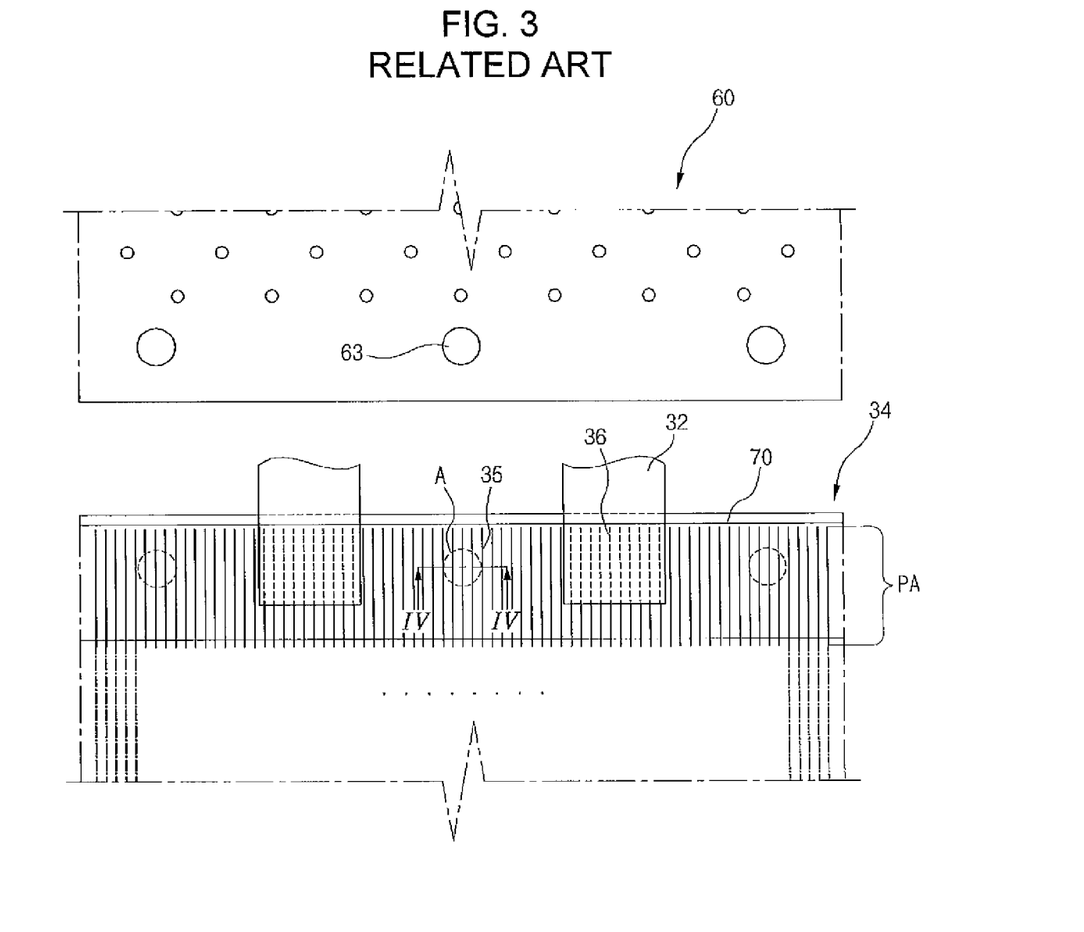
FIG. 3 is a view illustrating relationship of dummy output pads of a PCB and embossing patterns of a cover shield according to the related art.
Figure 4A:
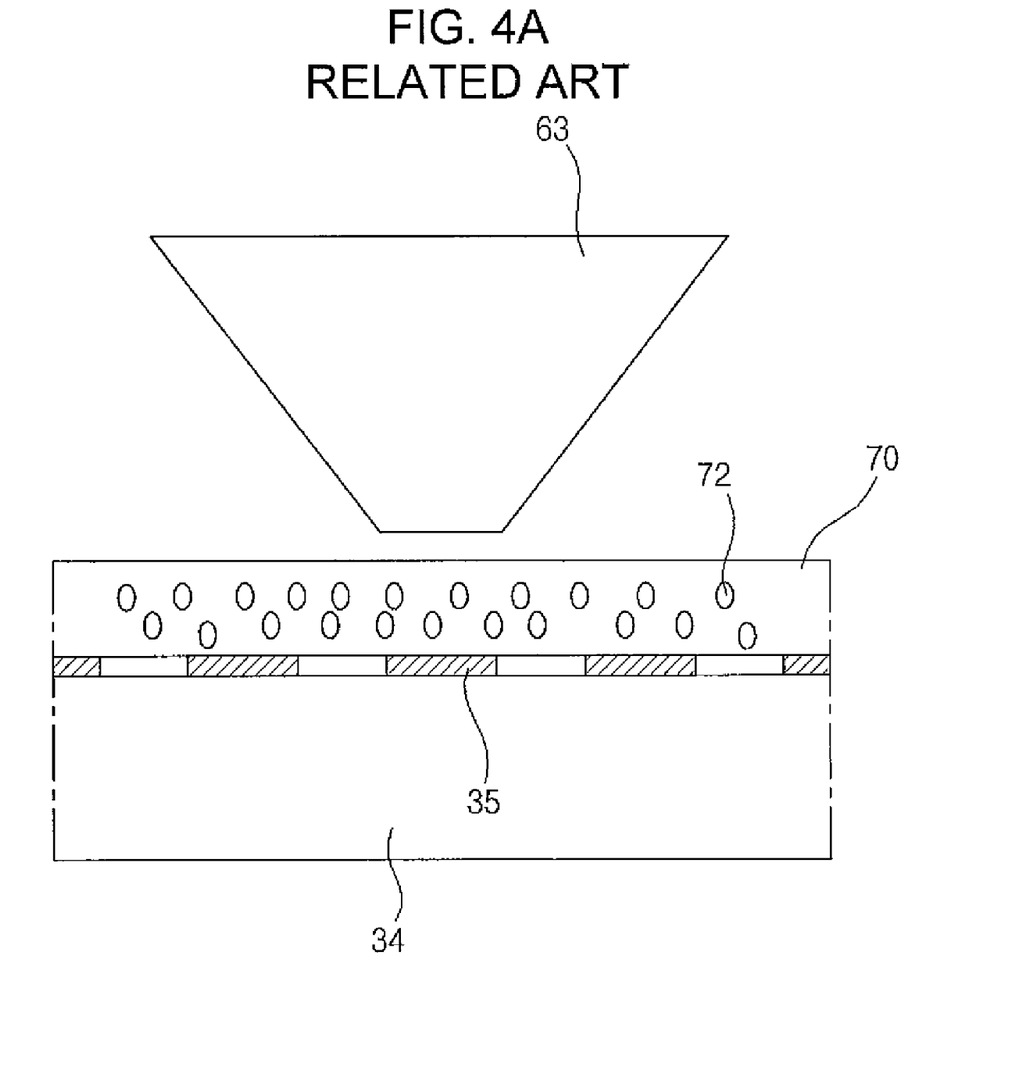
FIGS. 4A and 4B are cross-sectional views, taken along a line IV-IV, illustrating states that an external pressure is not applied to a cover shield and applied to the cover shield, respectively.
Figure 4B:
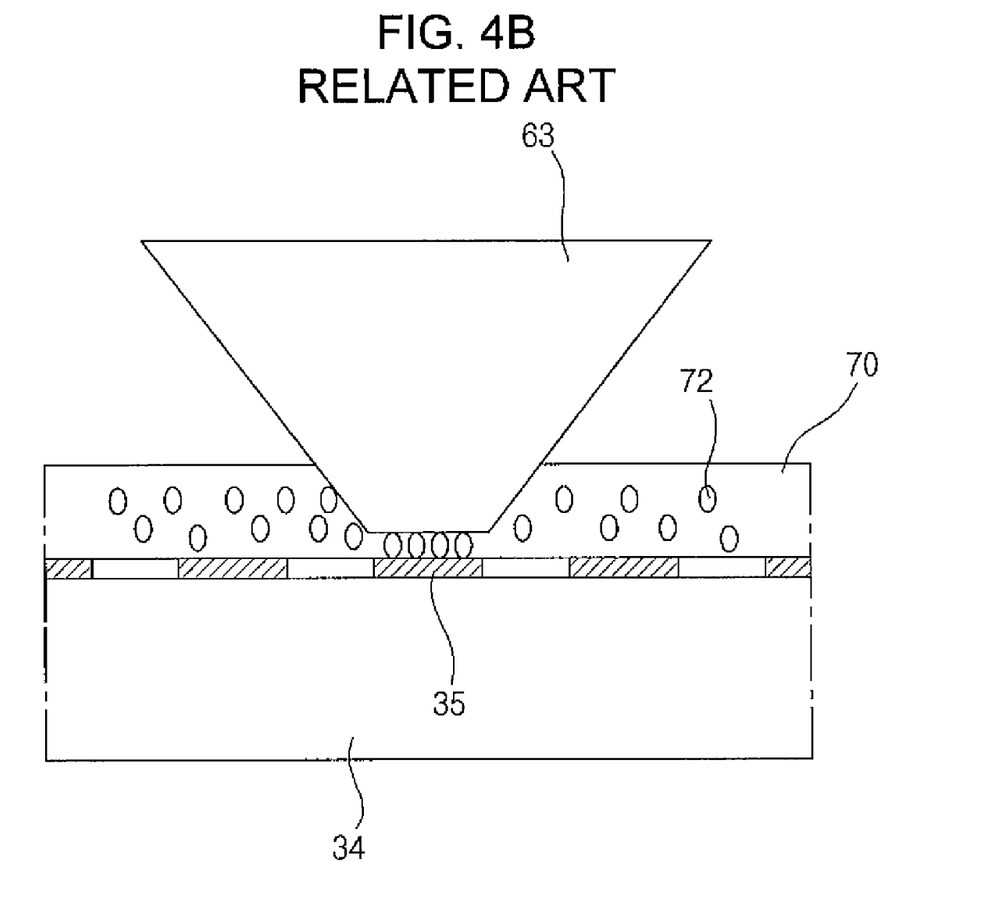

FIG. 3 is a view illustrating relationship of dummy output pads of a PCB and embossing patterns of a cover shield according to the related art, and FIGS. 4A and 4B are cross-sectional views, taken along a line IV-IV, illustrating states that an external pressure is not applied to a cover shield and applied to the cover shield, respectively.

Referring to FIG. 3, embossing patterns 63 correspond to a pad portion PA at a periphery of a PCB 34. Most of the embossing patterns 63 correspond to dummy output pads 35. An ACF 70 is formed entirely on the pad portion PA. A first portion of the ACF 70 connects an output pad 36 of the PCB 34 to an input pad of the TCP 32. A second portion of the ACF 70 located on the dummy pads 35 is exposed.

The output pads 36 and the dummy output pads 35 of the PCB 34 are connected to a PCB ground portion (not shown) to ground them. For example, all the pads 36 and 35 are connected to a ground line in the PCB 34 to ground them. To strengthen ground, the PCB ground portion is connected to at least one of other components of the LCD module made of metal which can act as other ground portion. For example, at least one or combination of a bottom cover (40 of FIGS. 1 and 2), a top cover (50 of FIGS. 1 and 2), a cover shield 60 and so on can be used as the other ground portion. To prevent electromagnetic interference (EMI), resistance, for example, of several ohms between the PCB ground portion and the other ground portion is needed. To do this, a resistor chip having several ohms may be used between the PCB ground portion and the other ground portion, and thus a predetermined ground state preventing EMI is obtained.

Referring to FIG. 4A, when an external pressure is not applied to the cover shield, a distance between the embossing pattern 63 and the second portion of the ACF 70 remains.

Referring to FIG. 4B, when an external pressure is applied to the cover shield, the embossing pattern 63 moves downward and presses the ACE 70. Accordingly, the embossing pattern 63 is electrically connected to the dummy output pad 35 through conductive particles 72 of the ACF 70. Due to such the unexpected connection, resistance between the PCB ground portion and the cover shield usable as the other ground portion is about 0 ohm, and thus the predetermined ground state in the PCB changes. Accordingly, there may occur EMI, and display quality is reduced.

SUMMARY

Accordingly, the present invention is directed to a liquid crystal display (LCD) module that substantially obviates one or more of the problems due to limitations and disadvantages of the related art.

An advantage of the present invention is to provide a liquid crystal display (LCD) module that can improve display quality.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display (LCD) module includes a liquid crystal panel; a backlight unit supplying light to the liquid crystal panel; a PCB including a plurality of output pads connected to the liquid crystal panel and a plurality of dummy output pads; and a cover shield protecting the PCB and including an embossing pattern, wherein at least one of the plurality of dummy output pads facing the embossing pattern is electrically isolated.

In another aspect, a liquid crystal display (LCD) module includes a liquid crystal panel; a backlight unit supplying light to the liquid crystal panel; a PCB including a plurality of output pads connected to the liquid crystal panel and a plurality of dummy output pads, the plurality of output pads and the plurality of dummy output pads connected to a ground portion; and a cover shield protecting the PCB and including an embossing pattern, wherein at least one of the plurality of dummy output pads facing the embossing pattern has an isolated piece which corresponds to the embossing pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to illustrated embodiments of the present invention, which are illustrated in the accompanying drawings.

Figure 5:
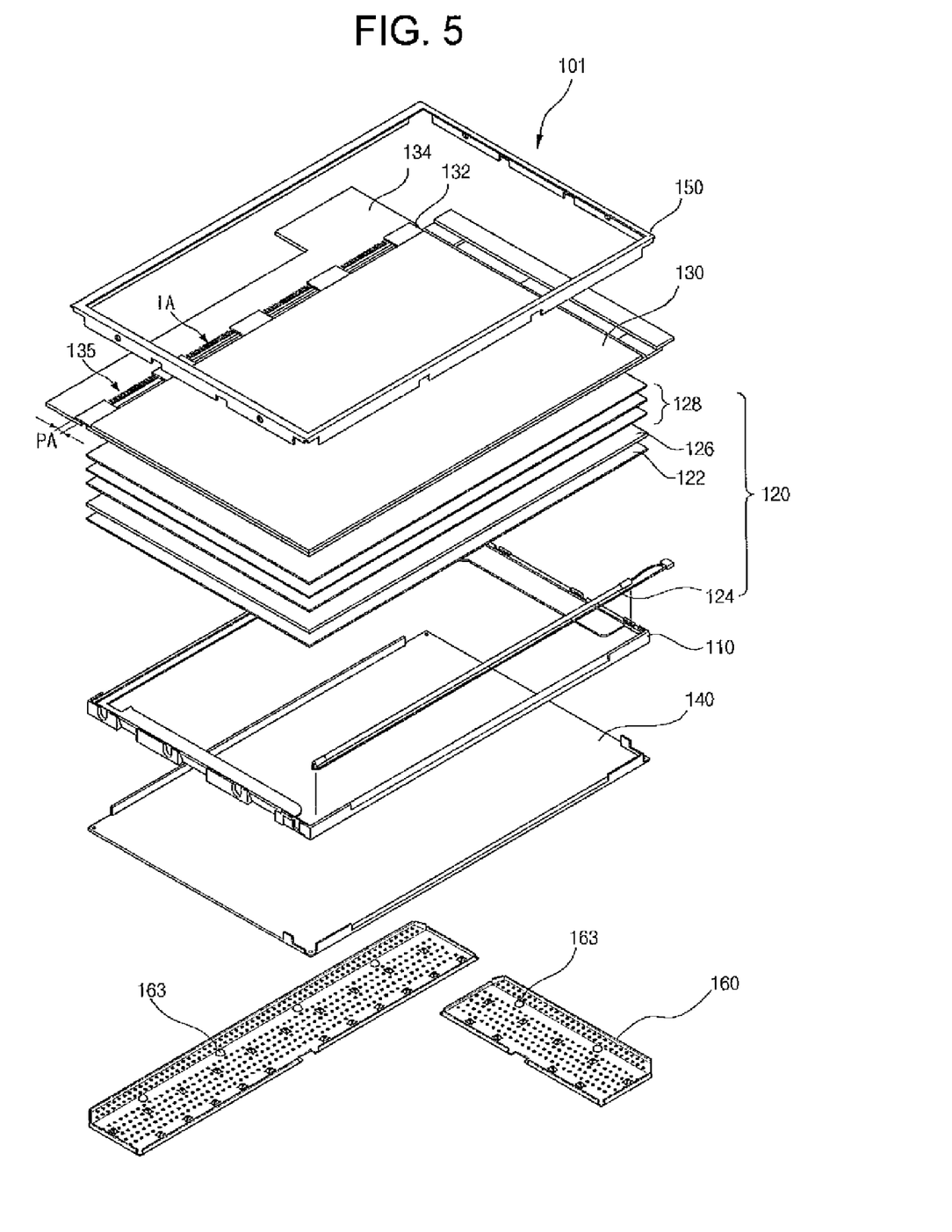
FIG. 5 is an exploded perspective view illustrating an LCD module according to an embodiment of the present invention.

FIG. 5 is an exploded perspective view illustrating an LCD module according to an embodiment of the present invention.

Referring to FIG. 5, an LCD module 101 includes a liquid crystal panel 130, a backlight unit 120, a main supporter 110, a bottom cover 140 and a top cover 150.

The backlight unit 120 and the liquid crystal panel 130 are sequentially located over a bottom cover 140. The main supporter 110 has a rectangular flame shape and supports the backlight unit 120 and the liquid crystal panel 130. The main supporter 110 is combined with the bottom cover 140. The top cover 150 is disposed on the top of the liquid crystal panel. The top cover 150 presses and fixes a peripheral portion of the liquid crystal panel 130 and is combined with the main supporter 110 and the bottom cover 140.

A PCB 134 as a driving circuit of the liquid crystal panel 130 is connected to the liquid crystal panel 130 through a plurality of TCP films 132 which are flexible. The PCB 134 has a plurality of output pads and dummy output pads 135 in a pad portion PA. The output pads of the PCB 134 are located in a first region of the pad portion PA, and the dummy output pads of the PCB 134 are located in a second region of the pad portion PA.

The TCP film 132 has a plurality of input pads and output pads. The liquid crystal panel 130 has a plurality of input pads. The output pad of the PCB 134 is connected to the input pad of the TCP film 132, and the output pad of the TCP film 132 is connected to the input pad of the liquid crystal panel 130. The dummy pads 135 are located between the output pads of the PCB 134.

To connect the output pad of the PCB 134 to the input pad of the TCP film 132, an anisotropic conductive film (ACF) is used. The ACF includes a bonding material and a plurality of conductive particles in the bonding material. The ACF is formed entirely in tie pad portion PA. To improve bonding efficiency between the PCB 134 and the TCP film 132, the same output pad structure in the PCB 134 is formed, and to do this, the dummy output pads 135 are formed.

The backlight unit 120 includes a backlight 124, a reflecting sheet 122, a light guide plate 126, and optical sheets 128 such as a prism sheet and a diffusion sheet. A lamp 124 is used as the backlight 124, and the lamp 124 is located at a side portion of the LCD module 101. The lamp 124 is guided by a lamp guider (not shown) that partially covers the lamp 124. The lamp 124 is fixed by a couple of lamp holders that are located at both ends of the lamp 124.

A cover shield 160 is located below the bottom cover 140 and covers the PCB 134 and a lamp driving circuit to protect them.

When modulizing the LCD module 101, for space efficiency, the PCB 134 is located below the bottom cover 140. To connect the PCB 134 at a bottom portion and the liquid crystal panel 140 at a top portion, the TCP film 132 is bent, for example, twice. The cover shield 160 has an embossing pattern 163 at an inner surface of the cover shield 160. The embossing pattern 163 faces and is spaced apart from the PCB 134.

The second region of the pad portion PA has an isolation region IA where the dummy output pads 135 are not connected to lines of the PCB and a PCB ground. Accordingly, the dummy output pads 135 in the isolation region IA are electrically floated.

Figure 6:
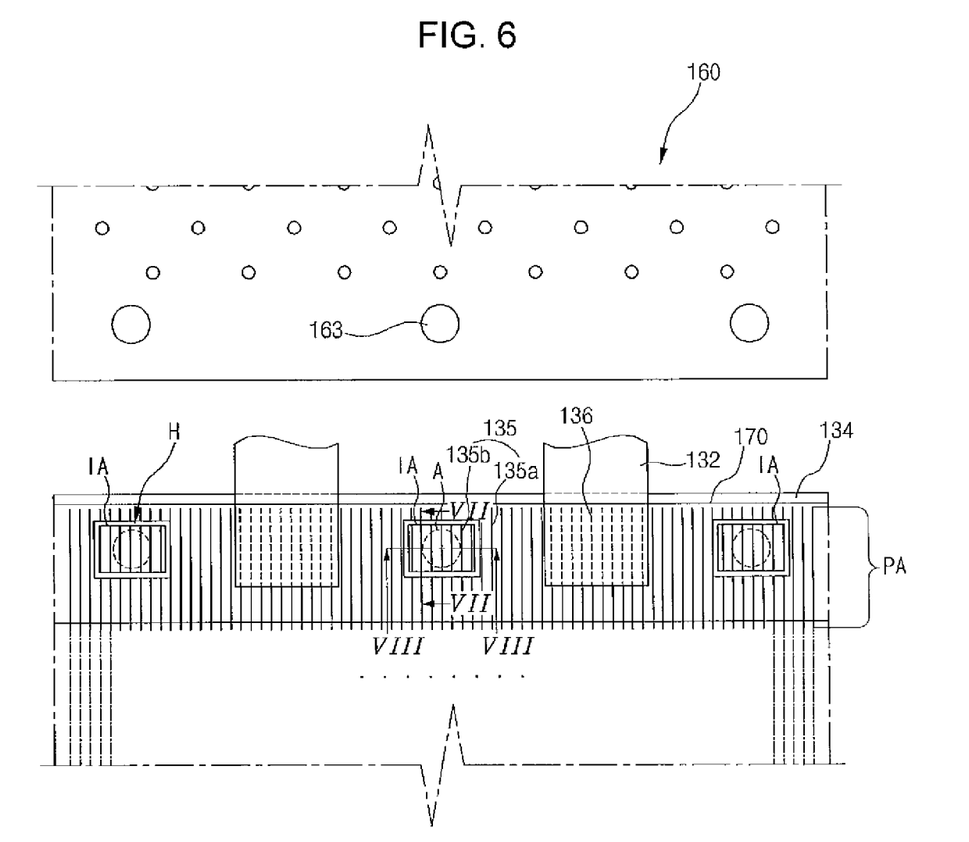
FIG. 6 is a view illustrating relationship of dummy output pads of a PCB having isolation region and embossing patterns of a cover shield according to the embodiment.
Figure 7:
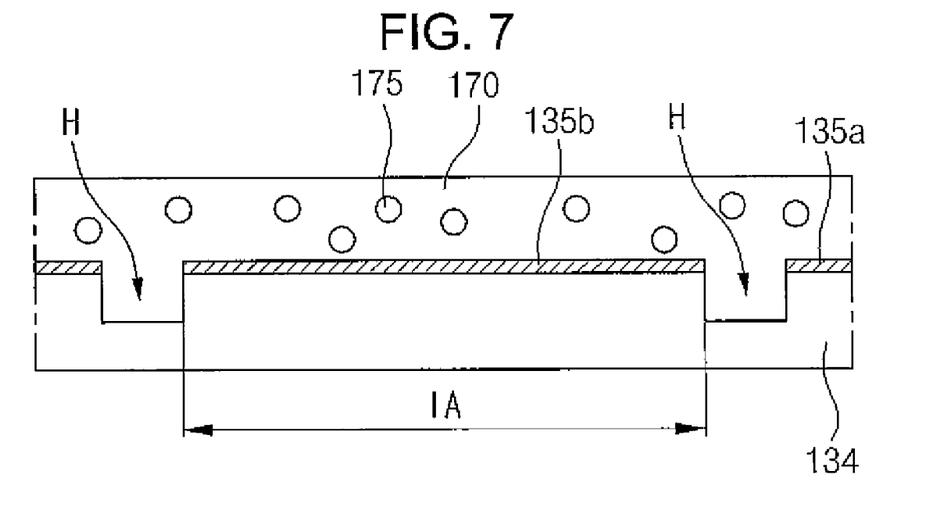
FIGS. 7 and 8 are cross-sectional views taken along lines VII-VII and VIII-VII, respectively.
Figure 8:
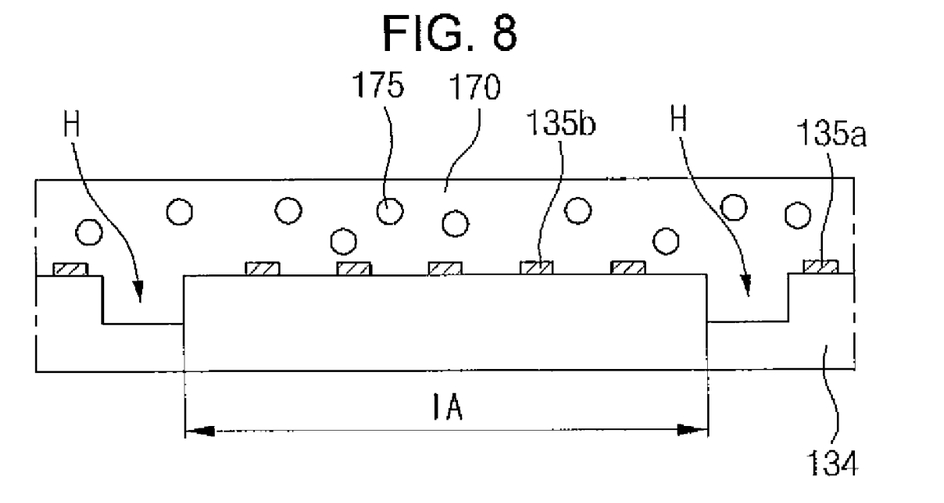

FIG. 6 is a view illustrating relationship of dummy output pads of a PCB having isolation region and embossing patterns of a cover shield according to the embodiment, and FIGS. 7 and 8 are cross-sectional views taken along lines VII-VII and VIII-VIII, respectively.

Referring to FIGS. 6 to 8, embossing patterns 163 correspond to a pad portion PA at a periphery of a PCB 134. Most of the embossing patterns 163 correspond to dummy output pads 135. An ACF 170 is formed entirely on the pad portion PA. A first portion of the ACF 170 connects an output pad 136 of the PCB 134 to an input pad of the TCP 132. A second portion of the ACF 170 located on the dummy pads 135 is not covered by and exposed between the TCP films.

The output pads 136 and the dummy output pads 135 of the PCB 134 are connected to a PCB ground portion (not shown) to ground them. For example, all the pads 136 and 135 are connected to a ground line in the PCB 134 to ground them. To strengthen ground, the PCB ground portion is connected to at least one of other components of the LCD module made of metal which can act as other ground portion. For example, at least one or combination of a bottom cover (140 of FIG. 5), a top cover (150 of FIG. 5), a cover shield 160 and so on can be used as the other ground portion. To prevent electromagnetic interference (EMI), resistance, for example, of several ohms between the PCB ground portion and the other ground portion is needed. To do this, a resistor chip having several ohms may be used between the PCB ground portion and the other ground portion, and thus a predetermined ground state preventing EMI is obtained.

An isolation region IA is formed in a second region of the pad portion PA and corresponds to the embossing pattern 163. The isolation region IA is isolated from other region of the second region of the pad portion PA. For example, the isolation region IA is isolated by a groove H surrounding the isolation region IA.

The isolation region IA has an area more than a contact area A of the embossing pattern 163 when an external pressure applied. The isolation region IA may have an island shape, for example, rectangular shape, and the groove H may have a frame shape surrounding the isolation region IA. The isolation region IA divides the dummy output pads 135 into first and second pads 135a and 135b in accordance that the dummy output pads 135 cross the isolation region IA. In other words, the first pad 135a does not cross the isolation region IA, while the second pad 135b crosses the isolation region IA. The second pad 135b may be separated into at least two pieces, for example, three pieces with the groove H between the pieces. Because the piece of the second pad 135b in the isolation region IA is electrically disconnected to other lines in the PCB, the piece of the second pad 135b in the isolation region IA is electrically disconnected to the PCB ground portion.

When the embossing pattern 163 is applied with an external pressure and connected to the dummy output pad 135 through the ACF 170, the embossing pattern 163 is connected to the isolated piece of the second pad 135b. Accordingly, even when the pressure is applied and the embossing pattern 163 is connected to the dummy output pad 135, the PCB ground portion is not connected to the cover shield usable as the other ground portion. Accordingly, the predetermined ground state in the PCB 134 does not change. As a result, EMI can be prevented, and display quality can be improved.

In the above embodiment, the groove is formed to ensure the electrical isolation. To form the groove, process of etching the PCB after forming the output pads and the dummy pads can be applicable. Alternatively, without the groove, the electrical isolation may be obtained. For example, the dummy output pads corresponding to where the groove is formed in the above embodiment may be etched and separated.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) module, comprising:
a liquid crystal panel;
a backlight unit supplying light to the liquid crystal panel;
a PCB including a plurality of output pads connected to the liquid crystal panel and a plurality of dummy output pads; and
a cover shield protecting the PCB and including an embossing pattern,
wherein at least one of the plurality of dummy output pads facing the embossing pattern is electrically isolated,
wherein the plurality of output pads and the plurality of dummy output pads are connected to a around portion, and
wherein the ground portion is connected to other component of the LCD module made of metal with a resistor between the ground portion and the other component of the LCD module.

2. A liquid crystal display (LCD) module, comprising:
a liquid crystal panel;
a backlight unit supplying light to the liquid crystal panel;
a PCB including a plurality of output pads connected to the liquid crystal panel and a plurality of dummy output pads; and
a cover shield protecting the PCB and including an embossing pattern,
wherein at least one of the plurality of dummy output pads facing the embossing pattern is electrically isolated,
wherein the plurality of output pads and the plurality of dummy output pads are connected to a ground portion, and
wherein the at least one of the plurality of dummy output pads is separated to have an isolated piece that is disconnected to the ground portion.

3. The module according to claim 2, wherein the PCB has a groove between the isolated piece and other piece of the at least one of the plurality of dummy output pads.

4. The module according to claim 1, further comprising a bottom cover, wherein the PCB is between the bottom cover and the cover shield.

5. The module according to claim 4, further comprising a flexible film connecting the PCB to the liquid crystal panel.

6. The module according to claim 5, further comprising an ACF on the plurality of output pads and the plurality of dummy output pads.

7. A liquid crystal display (LCD) module, comprising:
a liquid crystal panel;
a backlight unit supplying light to the liquid crystal panel;
a PCB including a plurality of output pads connected to the liquid crystal panel and a plurality of dummy output pads, the plurality of output pads and the plurality of dummy output pads connected to a ground portion; and a cover shield protecting the PCB and including an embossing pattern, wherein at least one of the plurality of dummy output pads facing the embossing pattern has an isolated piece which corresponds to the embossing pattern, and wherein the ground portion is connected to other component of the LCD module made of metal with a resistor between the ground portion and the other component of the LCD module.

8. A liquid crystal display (LCD) module, comprising:

a liquid crystal panel;

a backlight unit supplying light to the liquid crystal panel;

a PCB including a plurality of output pads connected to the liquid crystal panel and a plurality of dummy output pads, the plurality of output pads and the plurality of dummy output pads connected to a ground portion; and a cover shield protecting the PCB and including an embossing pattern, wherein at least one of the plurality of dummy output pads facing the embossing pattern has an isolated piece which corresponds to the embossing pattern, and wherein the PCB has a groove between the isolated piece and other piece of the at least one of the plurality of dummy output pads.

9. The module according to claim 7, further comprising a bottom cover, wherein the PCB is between the bottom cover and the cover shield.

10. The module according to claim 9, further comprising a flexible film connecting the PCB to the liquid crystal panel.

11. The module according to claim 10, further comprising an ACF on the plurality of output pads and the plurality of dummy output pads.

* * * * *